June 8, 1971  B. J. BURNS  3,583,078
EDUCATIONAL DEVICE
Filed April 14, 1969  2 Sheets-Sheet 1
FIG_1
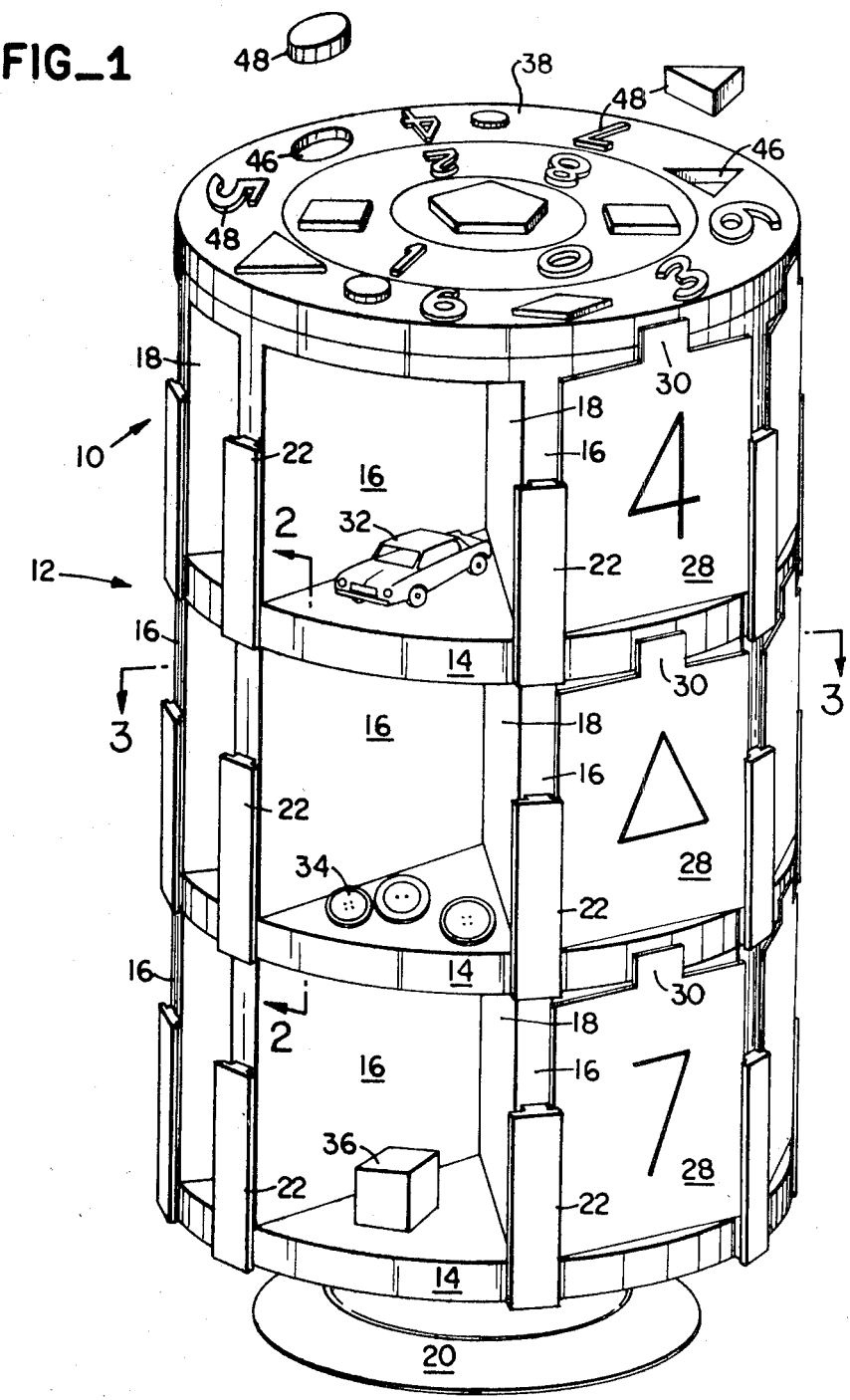
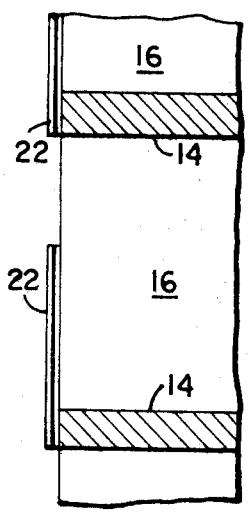
FIG_2
INVENTOR.
BETTYE J. BURNS
BY
Mellin, Moore & Weissenberger
ATTORNEYS

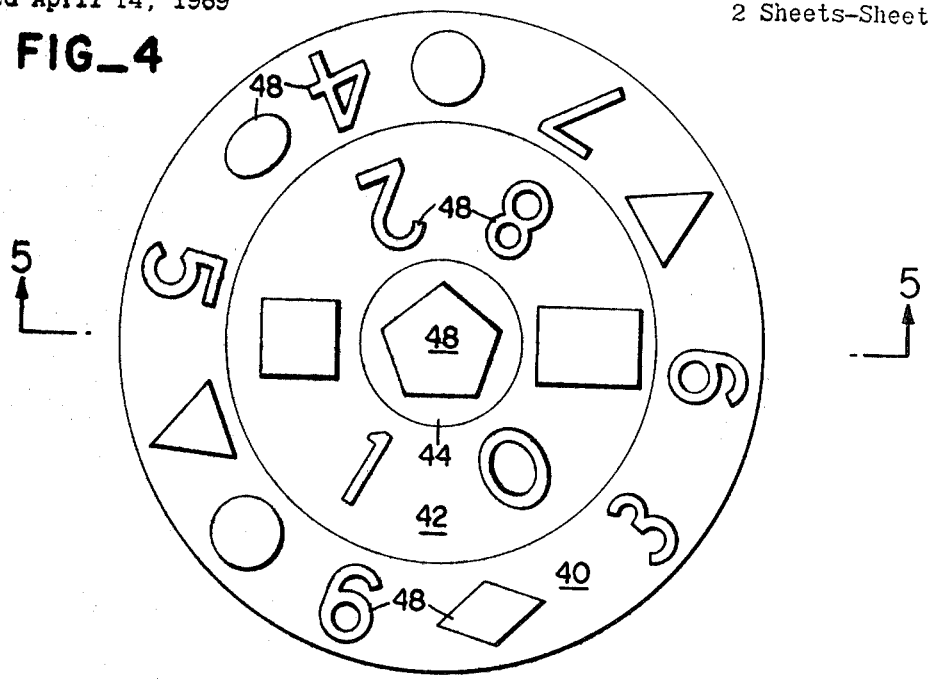
FIG_4
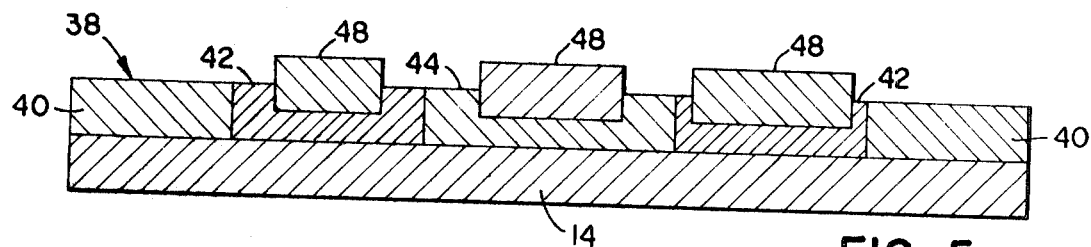
FIG_5
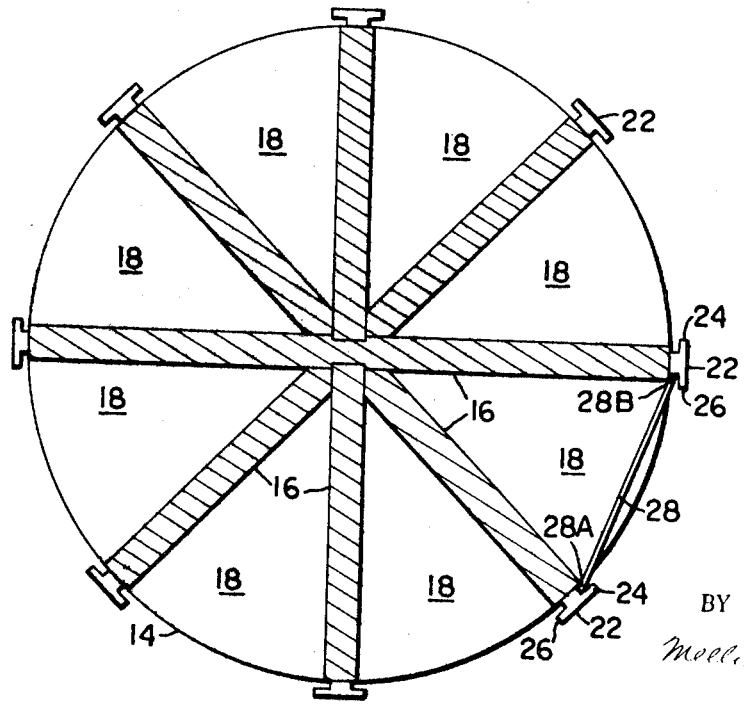
FIG_3
INVENTOR.
BETTYE J. BURNS
BY
*Mellin, Moore + Wassenberger*
ATTORNEYS United States Patent Office 3,583,078
Patented June 8, 1971

3,583,078
EDUCATIONAL DEVICE
Bettye J. Burns, 48 Carroll Drive,
Pittsburg, Calif. 94565
Filed Apr. 14, 1969, Ser. No. 815,799
Int. Cl. G09b 1/34
U.S. Cl. 35—73                               2 Claims

ABSTRACT OF THE DISCLOSURE

An educational device has a rotatable body of cylindrical configuration and defines a plurality of open compartments. A plurality of objects are included, each being of such size as to fit into a compartment. A plurality of cards are included, each having a symbol thereon which may correspond to one or more of the objects. Each card is selectively positionable over a compartment to close it. On top of the body is a ring having a number of indentations or depressions therein, each being configured to seat a matching object therein.

BACKGROUND OF THE INVENTION

This invention relates to educational devices, and more particularly, to an educational device which utilizes a rotatable, compartmented body in conjunction with objects which fit into the compartments, and cards which may have symbols thereon corresponding to the objects, which may be fitted to close the compartments.

Various devices are known and used as aids in the education of children. See, for example, U.S. Pats. Nos. 2,361,154 (Schoolfield), 2,900,742 (Barker et al.), 2,929,160 (Lyttle), and 3,146,534 (Brown et al). Each of these devices is used in substantially the same manner; presenting to the child a picture of an object, and having the child provide a word (perhaps made up of individual letters) which corresponds to the picture of the object. While such devices are quite useful in teaching word perception and spelling by sight (i.e. visually), they do not take full advantage of the well-known fact that a kinesthetic approach to teaching may be extremely effective with some children, and in some cases more effective than the usual approach.

It would be advantageous, therefore, to combine the visual teaching advantages of the known prior art devices with teaching through the use of the sense of touch. One way to effect such combination is to include three-dimensional objects, which can be related, e.g. by their shape or number, to indicia such as printed words or numerals corresponding to these objects. With these elements, a child can actually handle the objects, and match them with the printed indicia corresponding thereto.

It is a purpose of this invention to provide an educational device in which children can handle objects in such a manner as to match them with written indicia corresponding therefor.

It is a further purpose of this invention to provide an educational device, which, while fulfilling the above purpose, can with advantage be used simultaneously by several children so as to teach them the importance of cooperation and timing in the use of the device.

It is a still further purpose of this invention to provide an educational device, which, while fulfilling the above purposes, is extremely effective and versatile in use and simple, sturdy and attractive in design.

SUMMARY OF THE INVENTION

Broadly stated, the inventive educational device disclosed herein comprises a plurality of cards, each having a symbol or representation thereon, and a plurality of objects capable of being related to these symbols or representations in some manner, e.g. by shape, number, or color. Further included is a body of upright cylindrical configuration, rotatable about the axis of such cylinder. The body defines a plurality of open compartments, each of such size as to receive one or more objects. Means are associated with each compartment for receiving and holding a card to selectively cover the compartment. A plate is fixed to the top of the body and has a plurality of indentations therein, each being of such configuration as to seat a matching object therein.

BRIEF DESCRIPTION OF THE DRAWINGS

These and other purposes of the invention will become apparent from a study of the following specification and drawings, in which:

FIG. 1 is a perspective view of the inventive educational device disclosed herein;

FIG. 2 is a sectional view taken along the line 2—2 of FIG. 1;

FIG. 3 is a sectional view taken along the line 3—3 of FIG. 1;

FIG. 4 is a plan view of the educational device; and

FIG. 5 is a sectional view taken along the line 5—5 of FIG. 4.

DESCRIPTION OF THE PREFERRED EMBODIMENTS

Shown generally in FIG. 1 is the inventive educational device 10. The device 10 includes a body 12 which is made up of spaced, parallel discs 14 and radial walls 16, as shown in FIGS. 1 and 3. The discs 14 and walls 16 define together a plurality of open compartments 18. The body 12 is of upright cylindrical overall configuration, and the open compartments 18 are defined completely about the body 12. The body 12 is supported on a stand 20, and is rotatable thereon about the axis of such cylinder.

Associated with each compartment 18 and fixed to the ends of the radial walls 16 of body 12 are elongated members 22. These elongated members 22 are of generally T-shaped cross section (FIG. 3). That is, each elongated member 22 defines lips 24, 26 which are in spaced relation to the body 12.

A plurality of cards 28 are included in the educational device 10. Each of these cards 28, as shown in FIG. 1, is of such size as to cover and close a compartment 18. In order to position a card 28 over a compartment 18, one edge 28A of the card 28 (FIG. 3) is positioned between lip 24 of an elongated member 22 and the body 12 and an opposite edge 28B of the card 28 is positioned between the lip 26 of an adjacent elongated member 22 and the body 12. Such positioning may, of course, be achieved by sliding the card 28 downward into place. The card 28 is slid downward until the central portion of its bottom edge contacts the disc 14, in which position that compartment 18 is selectively covered. The cards 28, as shown in FIG. 1, may have tabs 30 thereon to facilitate such positioning and removal thereof.

A number of objects, such as objects 32, 34, 36 are included as part of the device 10. The objects 32, 34, 36 are shown configured, respectively, as a car, three buttons, and a block colored, say, yellow; but it will be understood that the objects of the device 10 will take a wide variety of configurations. The objects 32, 34, 36 are of such size as to fit into a compartment 18. Each card 28 has imprinted thereon a symbol or representation which in some manner relates to an object or set of objects. That is, for example, one card 28 will have imprinted thereon "Car," another "3," another a picture of a yellow lemon, and so on.

Fixed to the top disc 14 is a plate 38. The plate 38 comprises a ring portion 40 fixed to the top disc 14, an inner ring portion 42 seatable against the top disc 14 within the ring portion 40 and removable therefrom, and a disc portion 44 seatable against the top disc 14 within the inner ring portion 42 and removable therefrom. The ring portion 40, ring portion 42, and disc portion 44 have a plurality of indentations 46 thereon.

These indentations 46 may take a variety of configurations, and in this embodiment, are shown as geometrical shapes or numbers. Included are objects 48 which are configured to seat in these indentations 46, and which are of such size that each can be fitted into a compartment 18.

The educational device 10 herein described may be used in a variety of manners, of which a few will be described.

Initially, objects such as the car, buttons and block 32, 34, and 36 are positioned in compartments 18, by the teacher. The child is then given a set of cards 28 which have imprinted thereon symbols which correspond to these objects (i.e. for example, one having imprinted thereon the word "car," another the numeral "3," another a picture of a yellow object such as a lemon, and so on, as previously described). The child must match up the proper card 28 with the corresponding object or objects by sliding that card 28 over the compartment 18 containing that object, thereby closing the compartment 18.

The cylindrical configuration of the body 12, and its rotatability, are quite important. Such features allow a number of children to use the device 10 at the same time. For example, a first child can solve problems in accordance with the above, and when he has so solved them, the body 12 can be rotated to present a new set of problems to him. Upon rotation, a second child can check the first child's solutions to the first set of problems. Meanwhile, a third child, positioned opposite the first child, can solve a set of problems himself while the first child is solving his first set of problems, and that third child's work can be checked upon rotation of the body 12 by a fourth child.

Such rotation of the body 12 evokes interest in the children, and teaches them timing and cooperation, so that they will keep up with the other children.

In another example, objects 48 are fitted into the proper depressions 46 by the teacher, these objects 48 being shaped as numbers or geometrical figures. Cards 28, having symbols thereon which correspond to the numbers and geometrical shapes, are positioned over various compartments 18 by the teacher. A child then must match up each object 48 with a card 28, and place that object in the compartment 18 covered by that card 28. This child's work may then be checked by another child, after rotating the body 12, as in the previous example.

The objects 48 may then be removed from compartment 18 by another child and fitted into the proper depressions 46 in ring portion 40, ring portion 42, and disc portion 44.

With ring portion 42 and disc portion 44 being removable, they may easily be replaced by other ring and disc portions having other various depressions therein, and other objects, configured to fit into these depressions, may be provided. Such feature adds to the variety of utility which may be achieved with the educational device 10.

It will be understood that the educational device 10 can be used in a great variety of other ways. For example, it could be used to teach colors, mathematical operations, vocabulary (both English and foreign language), rules of grammar, spelling, and the like.

The educational device 10, besides being of aid in teaching such things, has the distinct advantage that the child handles the elements thereof while being taught by them. The movement and handling of such elements, including the turning of the body 12, develop coordination between the eye and the hand, and develop timing and muscular skill which are used in many activities.

Furthermore, it will be understood that the device can be used without any objects to teach, i.e. reading, writing and arithmetic through the use of the cards alone, as for example by making the child write down the solution to problems displayed on a set of cards.

The educational device 10, it will be seen, is thus extremely versatile and effective in use, and is simple, sturdy and attractive in design.

I claim:
1. An educational device comprising:
   (a) a plurality of cards, each having a symbol thereon;
   (b) a plurality of objects, each corresponding to a symbol;
   (c) a body defining a plurality of open compartments, each of such size as to receive an object;
   (d) means associated with each compartment for receiving and holding a card adjacent the compartment, said card, when so held, being positioned to cover the compartment; and
   (e) an object receiving member positioned on the body and having a plurality of indentations, each being of such configuration as to seat a matching object thereon;
   (f) said body being of substantially cylindrical overall configuration and being rotatable about the axis of such cylinder;
   (g) said object receiving member comprising:
      (i) a ring portion fixed to the upper end of said substantially cylindrical body and
      (ii) an inner portion seatable against the upper end of said substantially cylindrical body within said ring portion and removable therefrom.

2. A device according to claim 1 wherein the means associated with each compartment for receiving and holding a card comprise a pair of elongated members fixed to the body, each defining a lip spaced from the body, one edge of the card being positionable between one lip and the body, an opposite edge of the card being positionable between the other lip and the body.

References Cited
UNITED STATES PATENTS

| | | | |
|---|---|---|---|
| 948,521 | 2/1910 | Payne | 312—117 |
| 1,837,625 | 12/1931 | McKee et al. | 312—138 |
| 3,497,967 | 3/1970 | Lewis et al. | 35—35 |

LAWRENCE CHARLES, Primary Examiner

L. ANTEN, Assistant Examiner

U.S. Cl. X.R.

35—35